UNITED STATES PATENT OFFICE 2,580,201

ANTHRAQUINONE VAT DYESTUFFS

Paul Sutter, Binningen, and Walter Kern, Sissach, Switzerland, assignors to Ciba Limited, Basel, Switzerland, a Swiss firm No Drawing. Application June 23, 1949, Serial No. 100,964. In Switzerland July 9, 1948

5 Claims. (Cl. 260—261)

It is known that certain quinazoline derivatives are valuable intermediate products for the manufacture of vat dyestuffs (see French Patents Nos. 822,194 and 822,428). However, these quinazolines have been made hitherto by a complicated process and, furthermore, some of the starting materials are difficult to obtain.

Application Serial No. 756,808, filed June 24, 1947 (now U. S. Patent No. 2,530,025, granted November 14, 1950), describes a simpler process for making these in part known quinazoline derivatives, which consists in treating acylamino aryl-ortho-nitriles with agents capable of replacing a hydroxyl group by halogen. As such agents there come into consideration known substances which are capable, for example, of converting an acid into the corresponding acid halide. The use of phosphorus pentachloride is especially advantageous.

It is an object of the present invention to provide new diquinazoline compounds and vat dyestuffs containing a new diquinazoline configuration. Further objects will appear as the specification proceeds.

According to the present invention valuable quinazolines are made by treating with an agent capable of bringing about ring closure an acylamino-anthraquinone, in which two aminoanthraquinone residues are connected together by the residue of a dicarboxylic acid containing at least one aromatic nucleus and of which the carboxyl groups are aromatically bound, and in which each anthraquinone residue contains in ortho-position to the acylamino group a group containing the atomic grouping —C—N—.

The starting materials required for the present process can be obtained, for example, from aminoanthraquinones, especially 2-aminoanthraquinones, which contain in ortho-position to the amino group, especially in the 3-position, a group containing the atomic grouping —C—N—, for example, a cyano group or an acid amide group. As the residue of the dicarboxylic acid, which connects together the two aminoanthraquinone residues, there comes into consideration, for example, the residue of a purely aromatic dicarboxylic acid, that is to say one which is free from heterocyclic or hydrogenated rings, and especially a polynuclear aromatic dicarboxylic acid; and also the residue of an aromatic dicarboxylic acid which contains a heterocyclic ring. As examples of purely aromatic dicarboxylic acids there may be mentioned as mononuclear acids isophthalic acid and terephthalic acid and as polynuclear acids which may contain up to four rings fluoranthene dicarboxylic acid terphenyl-4:4''-dicarboxylic acid and especially diphenyl-4:4'-dicarboxylic acid. A useful dicarboxylic acid containing a heteroatomic ring besides two aromatic rings is, for example, diphenylene oxide-3:6-dicarboxylic acid.

The agents capable of bringing about ring closure are advantageously chosen in accordance with the starting material to be used. Thus, for example, in the case of those acylaminoanthraquinones which still contain an acid amide group in ortho-position to the acylamino group it is of advantage in some cases to use alkaline condensing agents for bringing about ring closure, and in the case of cyano-acylamino-anthraquinones phosphorus pentachloride may be used with advantage.

Thus, for example, a useful starting material for the present process is obtained by condensing 2 mols of 2-amino-3-cyanoanthraquinone with diphenyl-4:4'-dicarboxylic acid chloride, which product upon treatment with phosphorus pentachloride in nitrobenzene yields directly a diquinazoline containing chlorine as a substituent in the 4-position of each quinazoline residue. The resulting product is a valuable intermediate product for the manufacture of dyestuffs.

The invention also includes a process for making new vat dyestuffs, in which a diquinazoline containing halogen as a substituent in the 4-position of each quinazoline residue, and obtainable by the process above described, is reacted with an amine containing at least one replaceable hydrogen atom in the amine group. There are used with advantage primary amines of the aliphatic, hydroaromatic, aromatic or heterocyclic series, such as methylamine, ethylamine, aminobenzenes, amino-naphthalenes or heterocyclic amines such as dehydro-thiotoluidine. Valuable dyestuffs are obtained in many cases by using vattable amines, especially aminoanthraquinones, which may contain further substituents usual in vat dyestuffs, such as halogen atoms, alkoxy groups or acylamino groups. Thus, there are obtained by reaction with 2-aminoanthraquinone or 1-amino-5-benzoyl-amino-anthraquinone, dyestuffs yielding yellow to orange tints.

The foregoing diquinazolines are of special importance in that by reaction with 4-aminoanthraquinone-acridones there are obtained dyestuffs yielding valuable green tints having good properties of fastness, whereas tints of the same color and fastness are not easily obtainable with other components. The 4-amino-anthraquinone-acridones, such, for example, as 4-amino-anthraquinone-benzacridones, may, if desired, contain further substituents, such as usually occur in vat dyestuffs, for example, halogen atoms, in the Bz-nucleus.

Examples of such substituted 4-amino-anthraquinone-benzacridones are the products containing the following substituents in the positions as shown in the formula

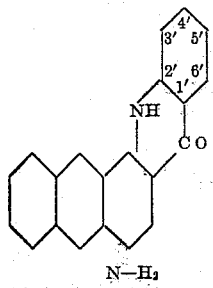

5'-chloro or 5'-bromo, 6'-chloro or 6'-bromo, 2':3':5'-trichloro, 4'-trifluormethyl, 4'-trifluormethyl-6'-chloro, 4'-methyl or methoxy. The substituents should of source be of non-ionogenic character and preferably of an atomic or radicalic weight not exceeding 80.

As a general rule the influence of such substituents is not very marked and a beneficial result brought about thereby, if any, is so small, that for the sake of simplicity the unsubstituted 4-amino-anthraquinone-2:1(N)-benzacridone is used in most of the examples.

The reaction of the diquinazolines with vattable amines is advantageously carried out by reacting each of the two halogen atoms of the diquinazoline with 1 mol of an amine, the two amines being identical or different. The reaction may, for example, be conducted in a high boiling solvent such as nitrobenzene, dichlorobenzene or phenol at a raised temperature, for instance, at the boiling point of the solvent. It is also possible to use an excess of the amine as a solvent.

The intermediate products and vat dyestuffs obtainable in accordance with the invention are new. The vat dyestuffs can be used in known manner for dyeing or printing a very wide variety of materials, such as wool or silk, and especially for dyeing or printing cellulosic fibres such as cotton or artificial silk or staple fibres of regenerated cellulose. They can also be converted by known methods into salts of sulphuric acid leuco esters and similar compounds and used by the methods usual for this class of dyestuffs.

The following examples illustrate the invention, the parts and percentages being by weight unless otherwise stated and the relationship of parts by weight to parts by volume being the same as that of the kilogram to the litre:

*Example 1*

4 parts of the acid amide of the formula

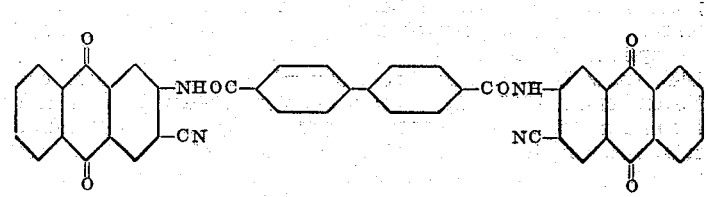

obtained by condensing 2-amino-3-cyano-anthraquinone with diphenyl-4:4'-dicarboxylic acid chloride, are heated at the boil with 4.8 parts of phosphorus pentachloride in 250 parts of nitrobenzene for ¾ hour. After cooling, the product is separated by filtering with suction, washed with nitrobenzene and then with benzene, and dried. The corresponding diquinazoline of the formula

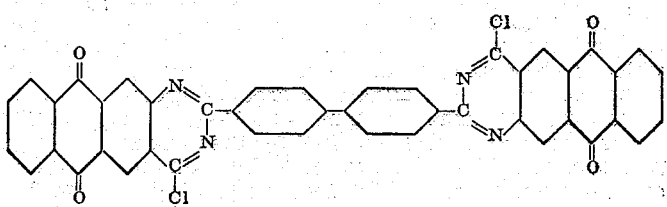

is obtained in the form of a sparingly soluble crystalline powder.

2.5 parts of the latter diquinazoline are heated at the boil with 2.3 parts of 4-amino-anthraquinone-2:1(N)-benzacridone in 50 parts of phenol for ½ hour. There are then added 50 parts of anhydrous pyridine, the whole is allowed to cool to about 60° C., and the product is separated by filtering with suction, washed with benzene and dried.

The crude product may be purified in the following manner: It is dissolved in about thirty times its weight of sulphuric acid of about 90 per cent strength, and slowly diluted with sulphuric acid of about 70 per cent strength until the concentration of te sulphuric acid has fallen to about 72 per cent and the dyestuff has precipitated in the form of a brown crystalline sulphate. After cooling, the product is separated by filtering with suction, and the sulphate is decomposed with water, separated by filtration, washed with water, and dried. There is obtained a green powder of the formula which dyes cotton from a violet-brown vat fast yellow-green tints.

If in this example 2.5 parts of 4-amino-anthraquinone-2:1(N)-1':2'(N)-5'-chloro-benzacridone are substituted for the 2.3 parts of 4-amino-anthraquinone-2:1(N)-benzacridone, a very similar dyestuff is obtained. An asymmetrical dyestuff consisting mainly of the compound of the formula

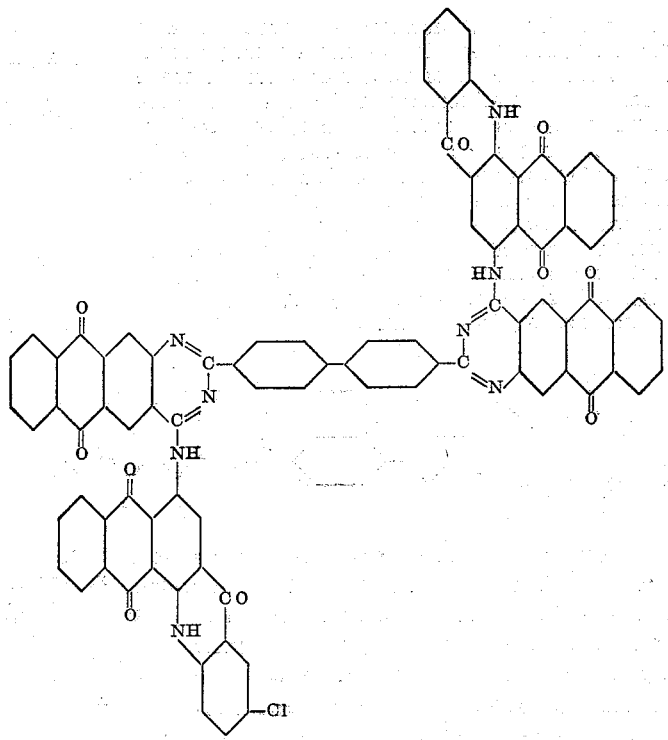

of very similar properties is obtained if 2.5 parts of the diquinazoline are first heated to about 120° C. with 1.25 parts of 4-amino-anthraquinone-2:1(N)-1': 2'(N) : 5'- chloro - benzacridone for ½ hour, then after addition of 1.15 parts of 4-amino - anthraquinone - 2:1(N) - benzacridone the whole is heated to the boil for another ½ hour.

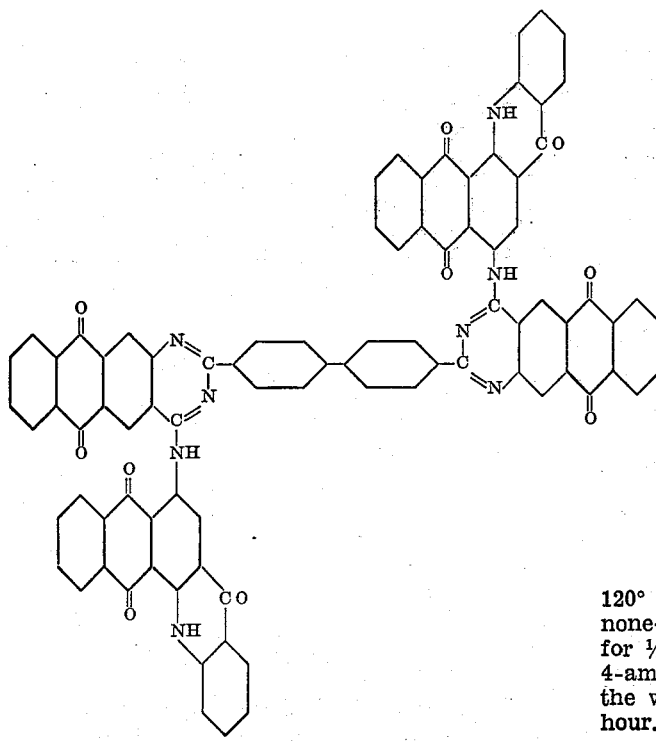

Example 2

1 part of the acid amide of the formula

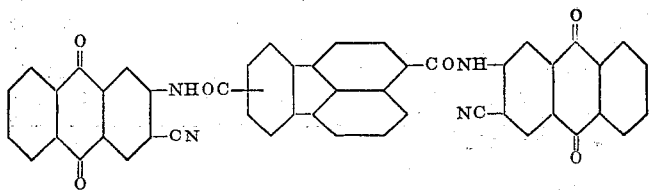

(obtainable from fluoranthene dicarboxylic acid dichloride and 2-amino-3-cyano-anthraquinone; the fluoranthene dicarboxylic acid can be made from dibromo-fluoranthene by reaction with cuprous cyanide and hydrolysis of the resulting dinitrile in the manner described in Patent No. 2,292,691) and 0.7 part of phosphorus pentachloride are heated at the boil in 60 parts of nitrobenzene for ½ hour. After cooling, the product is separated by filtering with suction, washed with nitrobenzene, and then with benzene, and dried. There is obtained a yellow-red powder corresponding to the formula

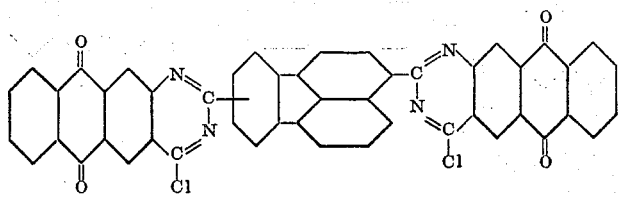

0.5 part of the latter quinazoline derivative is heated at the boil with 0.4 part of 4-amino-anthraquinone-2:1(N)-benzacridone in 15 parts of phenol for ¼ hour. 15 parts of pyridine are then added, the whole is allowed to cool to approximately 60° C., and the product is separated by filtering with suction. The filter residue is washed with alcohol and dried.

For the purposes of purification the product is dissolved in about 100 parts of sulphuric acid of 95 per cent. strength, 35 parts of sulphuric acid of 50 per cent. strength are gradually added, and the brown crystalline sulphuric acid salt of the dyestuff is separated by filtering with suction. After decomposing the latter with water, it is separated by filtration, and thoroughly washed with water and dried. There is obtained the dyestuff of the formula which dyes cotton from a brown-violet vat yellow-green tints.

Example 3

2 parts of the acid amide of the formula

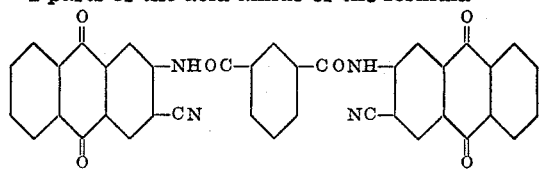

(obtainable from 2-amino-3-cyano-anthraquinone and iso-phthalic acid dichloride) are heated at the boil with 2.4 parts of phosphorus pentachloride in 60 parts of anhydrous nitrobenzene for ½ hour. After cooling, the product is separated by filtration, washed with nitrobenzene and then with benzene, and dried. There is obtained a yellowish powder corresponding to the formula

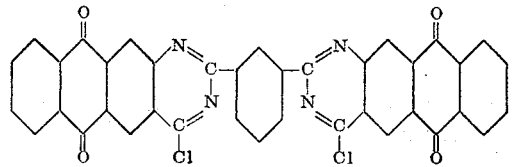

4 parts of the latter quinazoline derivative are heated at the boil with 3.7 parts of 4-amino-anthraquinone-2:1(N)-benzacridone in 70 parts of phenol for ½ hour. The whole is allowed to cool to approximately 60° C., 70 parts of pyridine are added, and the product is separated by filtering while hot. The filter residue is washed with alcohol and dried.

The product may be purified by fractional precipitation from sulphuric acid in the manner

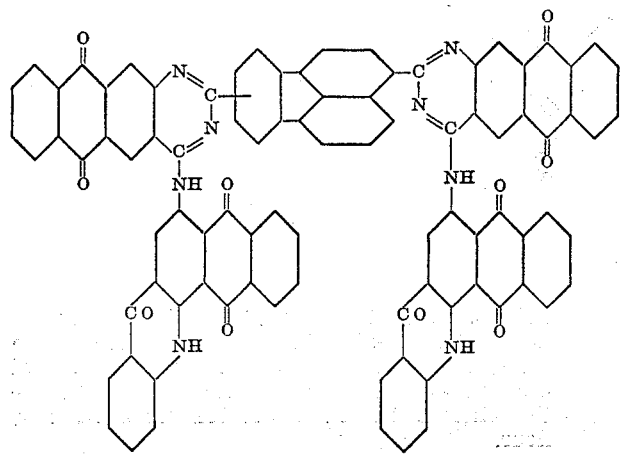

described in Example 2. The dyestuff so obtained has the formula

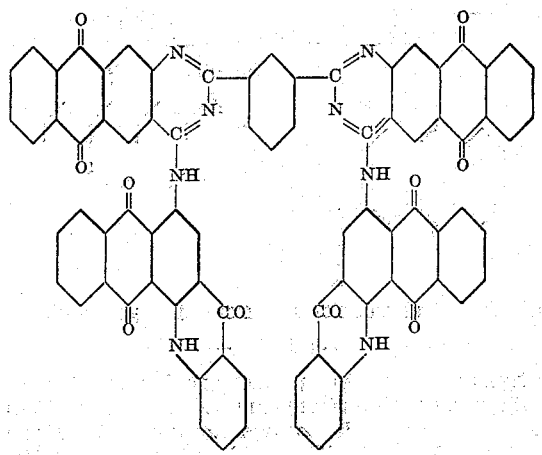

and dyes cotton from a brown-violet vat yellow-green tints.

*Example 4*

8 parts of the acid amide of the formula

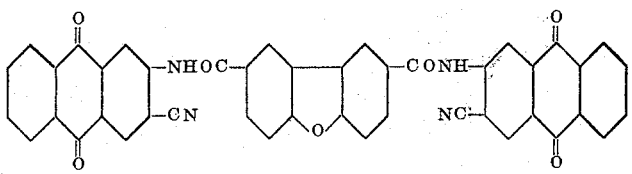

(obtainable from diphenylene oxide-3:6-dicarboxylic acid chloride and 2-amino-3-cyano-anthraquinone) and 5.6 parts of phosphorus pentachloride are heated at the boil in 240 parts of nitrobenzene for 1 hour. After cooling, the product is separated by filtering with suction, washed with nitrobenzene and then with benzene and dried. There is obtained a yellow-red product corresponding to the formula

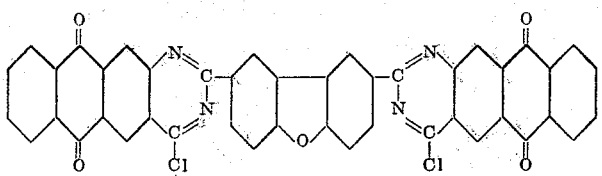

4.5 parts of the latter quinazoline derivative are heated at the boil with 3.6 parts of 4-aminoanthraquinone 2:1-(N)-benzacridone in 80 parts of phenol for ½ hour. 80 parts of pyridine are then added, the whole is allowed to cool to approximately 60° C., and the product is separated by filtering with suction. The filter residue is washed with alcohol and dried.

For the purpose of purification the product is dissolved in the necessary quantity of sulphuric acid of 98 per cent. strength, the whole is gradually diluted with water until the sulphuric acid has a concentration of 72 per cent., and the precipitated brown sulphate is separated by filtering with suction. After decomposition with water, the product is separated by filtration, washed with water and dried. The dyestuff so obtained is of the formula

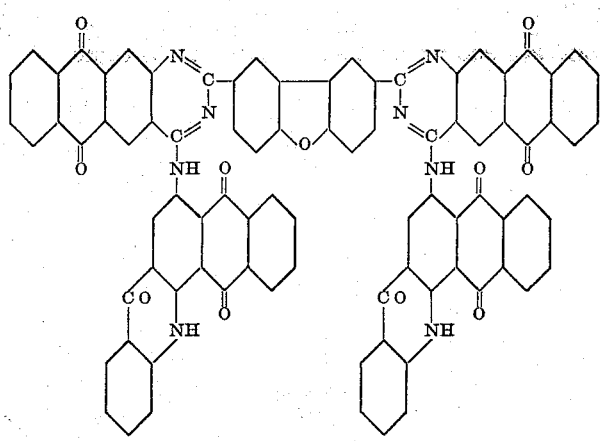

and dyes cotton from a brown-violet vat yellow-green tints.

*Example 5*

2 parts of the dyestuff obtained as described in the third paragraph of Example 1 are vatted at 50° C. in 300 parts of water with the addition of 8 parts by volume of caustic soda solution of 36° Bé. and 4 parts of sodium hydrosulphite. A dyebath is prepared from 2700 parts of water, 7 parts by volume of caustic soda solution of 36° Bé. and 4 parts of sodium hydrosulphite and the stock vat above described is added. 100 parts of wetted cotton are entered into the dyebath at 40° C., and after 15 minutes 60 parts of sodium chloride are added and dyeing is carried on for 1 hour while raising the temperature to 50° C. The cotton is then squeezed, oxidised in the air, rinsed, acidified, again rinsed and soaped at the boil for ½ hour with a solution containing, per litre of water, 3 grams of soap and 1 gram of anhydrous sodium carbonate. The cotton is dyed a fast yellow green tint.

What we claim is:

1. A vat dyestuff of the formula

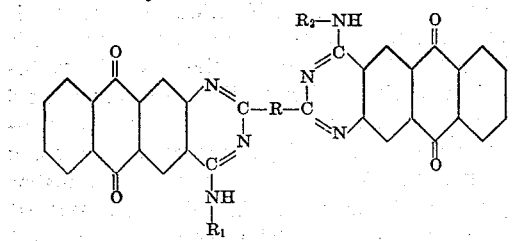

wherein R stands for an aromatic radical free from hydrogenated and heterocyclic rings and containing up to four rings and bound directly by two ring carbon atoms to the quinazoline radicals, and wherein each of $R_1$ and $R_2$ stands for a radical of an anthraquinone-2:1(N)-acridone attached in its 4-position to the respective —NH-groups shown in the formula.

2. A vat dyestuff of the formula

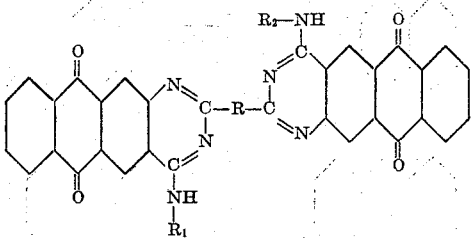

wherein R stands for a radical of the formula $$-(C_6H_4)_n-$$

wherein $n$ is an integer not greater than 3 and $C_6H_4$ represents a phenylene radical, and wherein each of $R_1$ and $R_2$ stands for a radical of an anthraquinone-2:1(N)-acridone attached in its 4-position to the respective —NH-groups shown in the formula.

3. The vat dyestuff of the formula

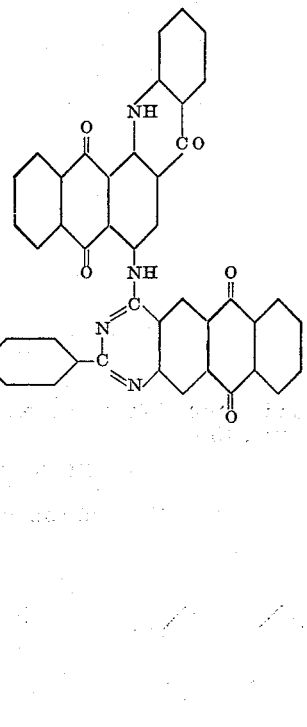

4. The vat dyestuff of the formula

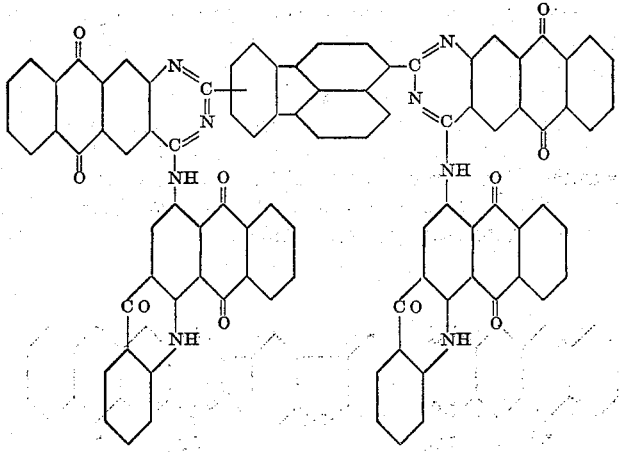

5. The vat dyestuff of the formula
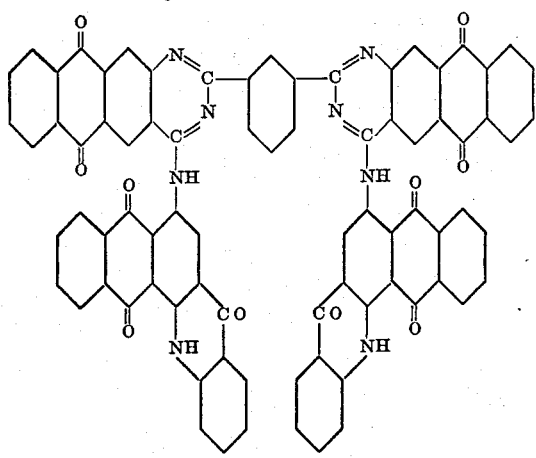
PAUL SUTTER.
WALTER KERN.
REFERENCES CITED
The following references are of record in the file of this patent:
UNITED STATES PATENTS
| Number | Name | Date |
|---|---|---|
| 2,187,813 | Baumann et al. | Jan. 23, 1940 |